United States Patent [19]

Paddock et al.

[11] 4,380,155

[45] Apr. 19, 1983

[54] TEMPERATURE SENSING CIRCUIT WITH HIGH NOISE IMMUNITY

[75] Inventors: Stephen W. Paddock, Evansville; Andrew T. Tershak, Centre Township, Vanderburgh County, both of Ind.

[73] Assignee: Whirlpool Corporation, Benton Harbor, Mich.

[21] Appl. No.: 238,521

[22] Filed: Feb. 26, 1981

Related U.S. Application Data

[62] Division of Ser. No. 68,473, Aug. 20, 1979, Pat. No. 4,297,851.

[51] Int. Cl.³ .............................. F25B 1/00; G01K 7/02
[52] U.S. Cl. ....................................... 62/229; 364/557; 374/170
[58] Field of Search .................. 62/126, 229; 165/26; 364/557; 374/170, 171

[56] References Cited

U.S. PATENT DOCUMENTS

| | | | |
|---|---|---|---|
| 3,505,828 | 4/1970 | Vander Molen et al. | 62/180 |
| 3,523,182 | 8/1970 | Phillips et al. | 219/501 |
| 3,616,846 | 11/1971 | Wills | 165/26 |
| 3,624,455 | 11/1971 | Hillman | 361/165 |
| 3,727,419 | 4/1973 | Brightman et al. | 62/228 R |
| 3,777,240 | 12/1973 | Neill | 318/471 |
| 3,826,305 | 7/1974 | Fishman | 165/26 |
| 3,942,718 | 3/1976 | Palmieri | 165/26 X |
| 3,979,739 | 9/1976 | Birchall | 340/529 |
| 4,005,316 | 1/1977 | Tomlinson | 307/247 A |
| 4,034,570 | 7/1977 | Anderson et al. | 62/158 |
| 4,112,703 | 9/1978 | Kountz | 62/211 |
| 4,187,093 | 2/1980 | Boratgis et al. | 62/126 |

OTHER PUBLICATIONS

Nagao et al., "Electronically Controlled Refrigerator with Electronic Thermometer", TOSHIBA REVIEW, International Edition, No. 120, Mar.–Apr. 1979, p. 34.

*Primary Examiner*—William F. Wayner
*Attorney, Agent, or Firm*—Wood, Dalton, Phillips, Mason & Rowe

[57] ABSTRACT

A refrigerator includes a compressor, a condenser, an evaporator, an evaporator fan and a temperature sensing circuit which includes a thermistor located to sense the average temperature of the cabinet air and a potentiometer manually adjustable to a desired temperature set point. The temperature sensing circuit also includes a first comparator stage which indicates whether the average temperature of the cabinet air is above or below a first value, the first comparator having little or no hysteresis in its response so that small changes in temperature can be detected. A second comparator stage indicates whether a signal at its input is greater or less than a second value, the second comparator stage having substantial hysteresis in its response to provide high noise immunity. An integrator is interposed between the first comparator stage and the second comparator stage to further enhance noise suppression.

5 Claims, 4 Drawing Figures

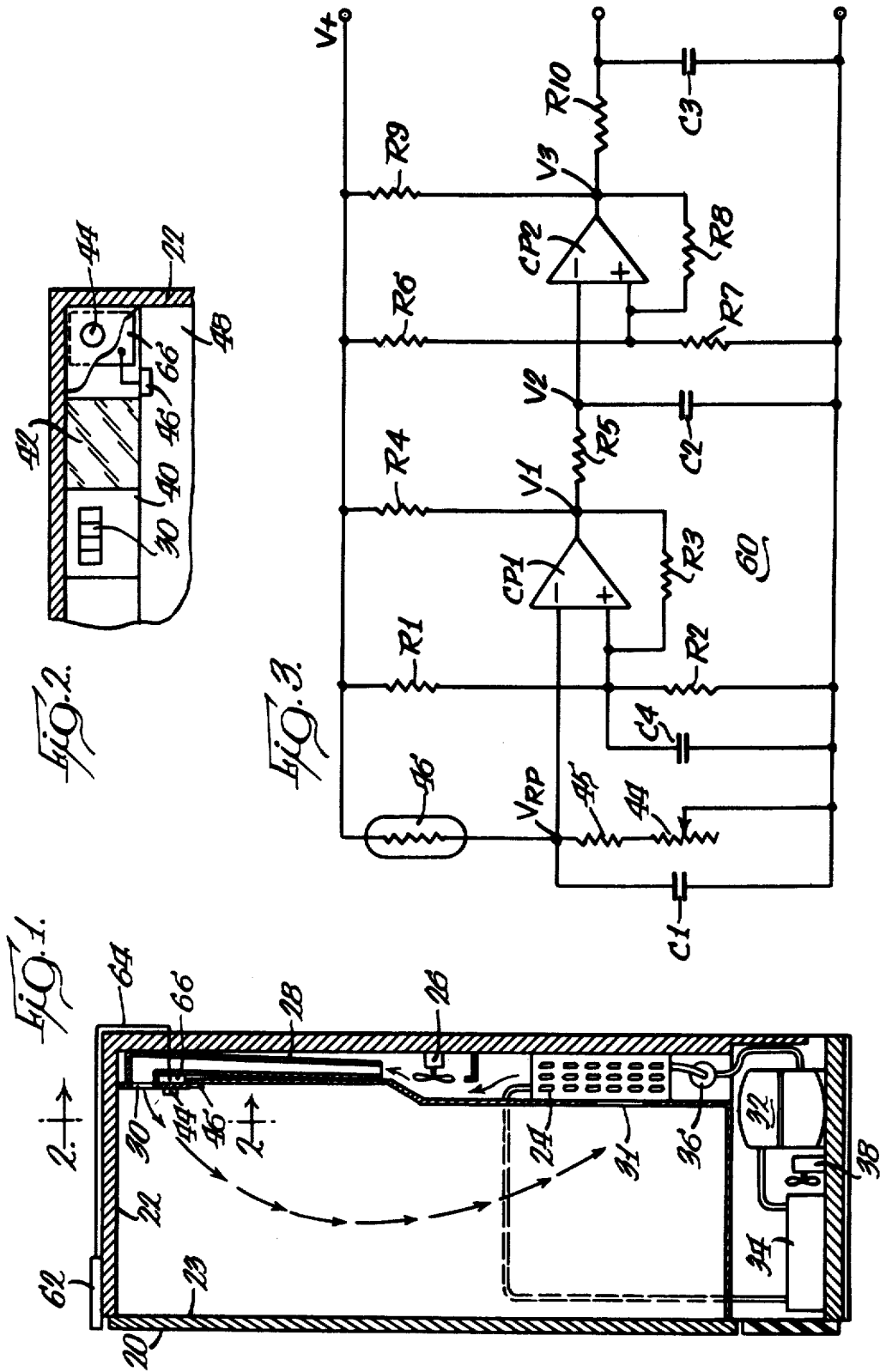

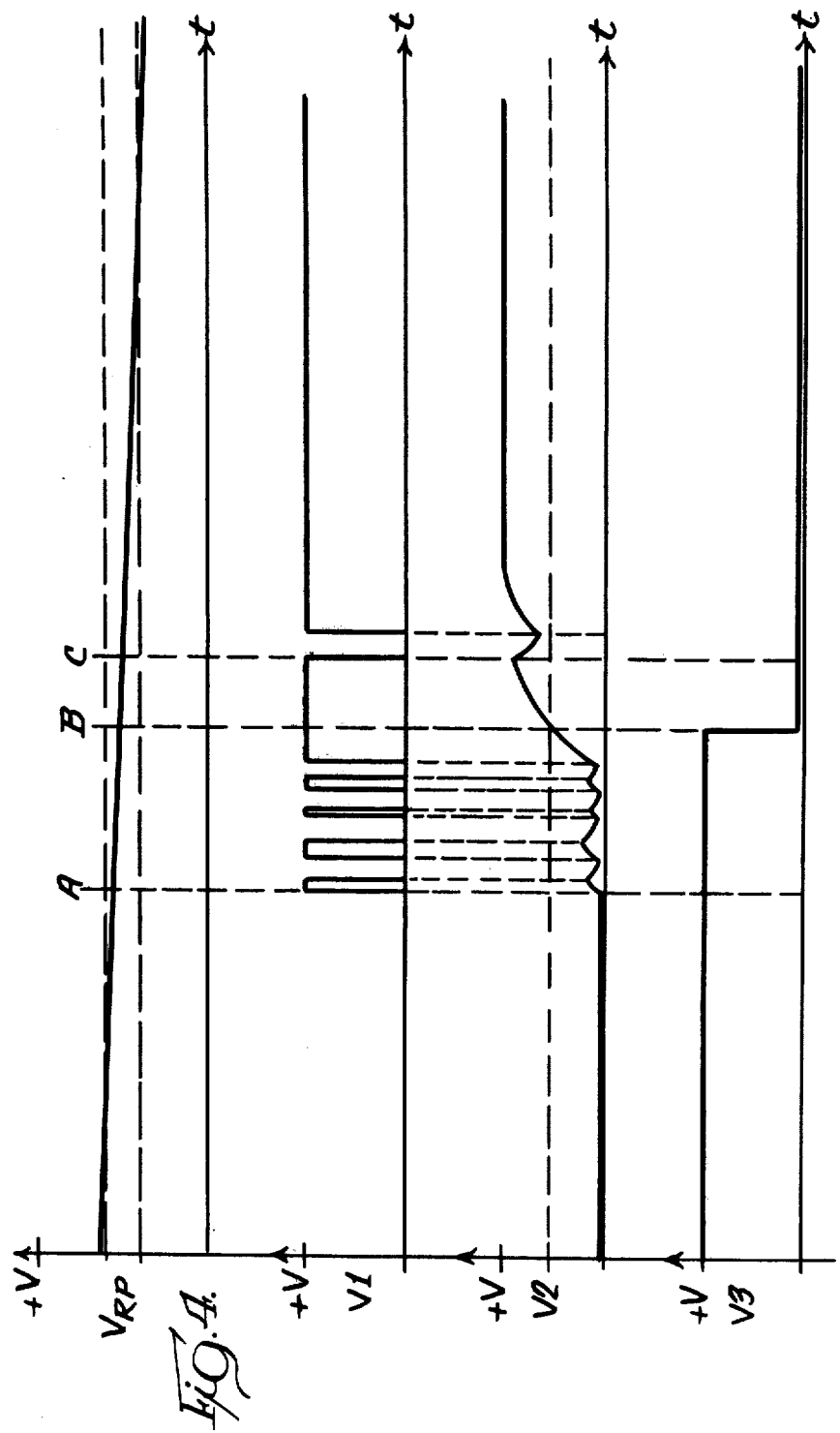

TEMPERATURE SENSING CIRCUIT WITH HIGH NOISE IMMUNITY

BACKGROUND OF THE INVENTION

This is a division, of application Ser. No. 68,473 filed Aug. 20, 1979, now U.S. Pat. No. 4,297,851.

The present invention relates to a temperature sensing circuit which produces a digital signal for indicating whether a sensed temperature is above or below a set point.

In many cooling systems such as refrigerators, a temperature sensing device is located in heat conduction relationship with a discharge air duct or the discharge air stream in order to sense discharge air temperature. In some cooling systems, the temperature sensing device is a thermistor which is typically a negative temperature coefficient device, i.e., its resistance increases as the sensed temperature decreases. Because the thermistor develops a low level analog signal, the temperature sensing circuit is particularly susceptible to noise developed in other parts of the cooling system. These noise signals can be caused by the opening and closing of contacts and relays or by noise that is present in the power supply. Additionally, the analog signal can be affected by variations in power supply voltage. Typically, these types of noise are reduced by employing large filter components which are relatively expensive.

Other temperature control systems employ the use of hysteresis to control the duty cycle of the apparatus. The duty cycle can be controlled by adjusting the amount of hysteresis through the use of a potentiometer. These systems are, however, relatively susceptible to noise, which can cause erroneous switching of the refrigerator components.

SUMMARY OF THE INVENTION

In accordance with the present invention, the disadvantages noted above have been overcome by providing a temperature sensing circuit which is provided with high noise immunity through the use of hysteresis. A temperature sensor is located so as to sense the average temperature of the cabinet air and a manually adjustable potentiometer allows manual selection of a set point. A first comparator develops a first output signal to indicate whether the sensed temperature is above or below a first value. The first comparator has little or no hysteresis in its response, so as to be able to sense small changes in temperature. The output of the first comparator is integrated and coupled to a second comparator which indicates whether the integrated signal is greater or less than a predetermined second value. The second comparator has substantial hysteresis in its response, to provide high noise immunity.

The thermistor is mounted in close proximity to the balance of the circuit and the entire circuit is mounted within the refrigerator cabinet. The digital output of the temperature sensing circuit is coupled to a refrigerator control, which may include a microcomputer, and may be located external to the refrigerator cabinet.

While the temperature sensing circuit will be disclosed with respect to a refrigerator, it will be appreciated that the temperature sensing circuit is adaptable for use in various cooling systems or heating systems in which desired temperatures are to be maintained by means of a periodically energized device.

One object of the present invention to to provide a temperature sensing circuit that will detect small temperature changes while providing high noise immunity. In a preferred form, the circuit employs the use of cascaded comparators, with the first comparator having little or no hysteresis in its response, while the second comparator exhibits substantial hysteresis in its response.

Another object of this invention is to provide, in a refrigerator, a temperature sensing circuit that is mounted within the refrigerator cabinet. In a preferred form, a thermistor produces a low level analog sensing signal and has a short lead length to the remainder of the temperature sensing circuit so as to minimize noise interference. The digital output signal of the circuit is coupled to a refrigerator control which may be external to the refrigerator cabinet.

It is another object of this invention to provide a temperature sensing circuit which achieves high noise immunity without the need for large and relatively expensive filter components.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 shows a side plan view of a refrigerator showing the location of the temperature sensing circuit and the external refrigerator control;

FIG. 2 is a front plan view showing the location of the temperature sensor within the refrigerator cabinet, taken along lines 2—2 of FIG. 1;

FIG. 3 is a schematic diagram of the temperature sensing circuit of the present invention; and FIG. 4 illustrates waveform diagrams (not to scale) of the circuit operation taken at various points within the circuit of FIG. 3.

DESCRIPTION OF THE PREFERRED EMBODIMENT

Referring to FIG. 1, a refrigerator 20 includes a cabinet 22, which may include a plurality of refrigerated compartments, cooled by a forced air refrigeration system. A hinged door 23 provides access to the cabinet. Air is refrigerated as a result of being passed in heat exchange relationship with an evaporator 24 and is forced by an evaporator fan 26 through a discharge air duct 28 to an outlet grill 30 into the refrigerator compartment. Return air is circulated through a grill inlet 31 to the evaporator 24. The refrigeration apparatus includes a conventional compressor 32, condenser 34, and accumulator or header 36, interconnected through tubing to the evaporator 24 to effect the flow of refrigerant thereto. A condenser fan 38 circulates air through the condenser 34, and may be energized concurrently with the compressor 32 and evaporator fan 26.

As seen in FIG. 2, a control panel 40, which mounts the discharge air grill 30, includes a translucent panel 42 behind which an electric light is located for illuminating the cabinet. The panel 40 also mounts a circuit board 66 on which is mounted a manually adjustable potentiometer 44 by which the user can select the set point or desired temperature of the refrigerated compartment. A temperature sensor 46, such as a thermistor, is mounted on the upper portion of the rear cabinet panel 48, behind the control panel 40, and is directly exposed by vent openings, or by the lack of a bottom wall for the panel 40, to a temperature which is representative of the average temperature of the refrigerated cabinet air. This location is preferred when using a thermistor or other analog temperature sensing device which has little or no hysteresis, as opposed to being located in heat transfer relationship with the discharge air stream from inlet 31 so as to monitor discharge air temperature.

The temperature sensing circuit, which includes the thermistor 46 and potentiometer 44 is shown in detail in FIG. 3. The thermistor 46 and potentiometer 44 are connected to a trigger circuit 60, also mounted on the circuit board 66 behind the panel 40, which operates to provide a digital output indicating whether the sensed temperature is above or below the set point. The timed duration of the "on" or "run" time for the compressor 32 and the fans 26 and 38 is determined by the trigger circuit 60 which in turn is responsive to the temperature sensed by the thermistor 46. The digital output of trigger circuit 60 is sent to a housing 62, see FIG. 1, which contains a digital display and an electronic refrigerator control located externally on the top of the refrigerator 20 to control the run time for the compressor 32 and the fans 26 and 38. The electronic control can be in the form of a microcomputer control system. For a detailed description of the operation of an electronic control which utilizes the present circuit, reference should be made to the co-pending application of Stephen W. Paddock, Ser. No. 18,762, filed Mar. 8, 1979, and entitled, "Adaptive Temperature Control System". It should, however, be understood that the temperature sensing circuit can be used with other types of refrigerator controls.

The trigger circuit 60, as seen in FIG. 3, responds to the thermistor 46 which may be of the negative temperature coefficient type. Thermistor 46, fixed resistor 45 and the potentiometer 44 are connected in series between a positive voltage supply, or V+, and a source of reference potential, or ground. The junction between thermistor 46 and resistor 45 (point $V_{RP}$) is coupled to the negative (−) input of an operational amplifier connected to form a comparator CP1, the positive (+) input of which is connected to the junction of a voltage divider consisting of resistors R1 and R2 which provide a first value signal. A positive feedback resistor R3 is coupled from the output of comparator CP1, at point V1, back to its positive input, and the output of CP1 is also coupled through a pull-up resistor R4 to V+. Capacitors C1 and C4 couple the minus (−) input and plus (+) input respectively of comparator CP1 to reference potential. These capacitors are used to filter out spurious signals.

The output of comparator CP1 is coupled serially to the negative input, at point V2, of a second operational amplifier connected to form a comparator CP2, through an RC filter, or integrator, consisting of a resistor R5 and a capacitor C2. Resistors R6 and R7 form a voltage divider, the junction of which is connected to the positive input of comparator CP2 to provide a second value signal. The output of comparator CP2, at point V3, is coupled back to its positive input by another positive feedback resistor R8 and to the V+ source by pull-up resistor R9. The output signal from comparator CP2 is passed through a high-frequency filter consisting of resistor R10 and capacitor C3 and is coupled by line 64 to the refrigerator control, not a part of this invention, which is located within the housing 62.

To maximize noise immunity and minimize chatter which can occur as the resistance of thermistor 46 slowly changes through the trip region, the value for resistor R3 is selected to provide a small amount of hysteresis for the first comparator stage (corresponding, for example, to 0.5° F. or less). The value for resistor R8 is selected to provide a relatively large amount of hysteresis for the second comparator stage. To achieve this effect, resistor R3 is made large compared with resistor R8. In the preferred embodiment, resistor R8 provides a 4 volt hysteresis when operating from an 8.5 volt supply. In this manner, small temperature changes are detected by the first comparator stage, i.e., comparator CP1, thermistor 46 and associated circuitry, while the second comparator stage, i.e., comparator CP2 and associated circuitry, provides high noise immunity. A still larger hysteresis for the second comparator stage would provide better noise immunity, but would also increase the response time of the system. It is desirable that the time constant of the RC filter formed by resistor R5 and capacitor C2 be rather large, for example, two or three seconds.

Referring now to FIGS. 3 and 4, the circuit operation now will be described, it being assumed that the condenser fan 38, compressor 32 and evaporator fan 26 have all been concurrently energized and the refrigerator is cooling down in 110° F. ambient temperature with a "cold" control setting. These conditions result in a typical temperature change rate of approximately 0.025° F./minute as sensed by thermistor 46. This rate of temperature change will vary, depending on the design of the refrigerator involved.

Because the thermistor 46 is of the negative temperature coefficient type, its resistance will be lower at high temperatures than at cooler temperatures. Therefore, as the refrigerator is just starting its cooldown cycle, much of the supply voltage V+ will appear across resistor 45 and potentiometer 44, as seen in the voltage diagram $V_{RP}$ of FIG. 4, the exact amount depending upon the manual adjustment of the potentiometer knob. Resistors R1 and R2 are selected so that when the refrigerator cabinet temperature is higher than the set point, the voltage appearing across resistor 45 and potentionmeter 44 will be greater than the first value voltage appearing at the plus (+) input of comparator CP1.

The output, consequently, of comparator CP1 is a low state signal as shown by voltage diagram V1 of FIG. 4. This first stage low state output signal is coupled through the RC filter comprised of resistor R5 and C2 to the negative input of comparator CP2. Because resistors R6 and R7 are selected so that the second value voltage appearing at the plus input of comparator CP2, i.e., the voltage across resistor R7, is greater than the low state voltage coupled from the RC network to its negative input, the output of comparator CP2 will be high as shown by voltage diagram V3 of FIG. 4. This high state output of CP2 is fed back to its plus input through resistor R8 to provide a substantial amount of hysteresis, the exact amount of which is dependent upon the value of resistor R8. The digital output of comparator CP2 is coupled to the high frequency filter comprised of resistor R10 and capacitor C3 and supplied to the line 64 which feeds the signal to the control in housing 62.

As the refrigerator cabinet temperature drops in response to cooling by the condenser 34, condenser fan 38, compressor 32 and the evaporator fan 26, the resistive value of the thermistor 46 increases, thereby decreasing the voltage drop across resistor 45 and potentiometer 44. When the voltage across resistor 45 and potentiometer 44 lowers sufficiently to closely approximate the voltage appearing at the plus input of comparator CP1, noise that is present in the system due to the opening and closing of switches within the refrigerator and noise inherent in the power supply causes the output of comparator CP1 to flucturate, as indicated by point A of waveform diagram V1 of FIG. 4.

The integrator consisting of resistor R5 and capacitor C2 transforms the output of comparator CP1 into a series of exponential signals, as shown in the waveform diagram V2 of FIG. 4. When the voltage at the output of the integrator, which is connected to the minus input of comparator CP2, reaches and exceeds the voltage appearing at the plus input of comparator CP2, as augmented by the positive feedback voltage from the output connected through resistor R8, the output of comparator CP2 will assume a low state, as shown in the V3 waveform diagram of FIG. 4 and indicated by point B. It should be noted that even if noise continues to affect the input to comparator CP1, the long time constant of the integrator consisting of resistor R5 and C2 and the large hysteresis of comparator CP2 will prevent the output of comparator CP2 from fluctuating between states, as shown by point C of FIG. 4.

When point B of FIG. 4 is reached, indicating that the refrigerator compartment has sufficiently cooled to reach the set-point, the output of comparator CP2 will assume a low state which is sent to the refrigerator control over line 64 to de-energize the refrigerator components.

The circuit works in a substantially similar manner as the refrigerator compartment warms sufficiently to exceed the set point. As the refrigerator compartment warms, the voltage across resistor 45 and potentiometer 44 increases until it meets or exceeds the voltage appearing at the plus input of comparator CP1 as augmented by the voltages from its output through resistor R3. Again, when the voltage appearing at the minus input of comparator CP1 closely approximates the voltage at its plus input, the circuit becomes highly sensitive to noise and fluctuations at the output of comparator CP1 again occur. The output voltage is integrated by the RC filter in a similar manner as before, and when that integrated voltage coupled to the minus input of comparator CP2 becomes less than the voltage appearing at its plus input, the output of comparator CP2 again assumes the high state. Due to the hysteresis employed, a lower voltage is now required at the minus input of comparator CP2 to effect switching of its output to the high state than was required during the previously described period when the refrigeration apparatus was energized to reduce the temperature of the refrigerated space. This high state signal from comparator CP2 is coupled through resistor R10 and capacitor C3 to the refrigerator control by way of line 64 to begin another cooling cycle.

The trigger circuit 60 is mounted behind the control panel 40 within the cabinet 22 of refrigerator 20 so that all the components are exposed to the same ambient temperature. Because this temperature is predictable, circuit reliability and stability is assured. The circuit is particularly susceptible to noise at the input of comparator CP1 because the analog signal developed by thermistor 46 is a low level signal; hence, it is preferable to keep the lead lengths between thermistor 46 and trigger circuit 60 as short as possible so as to minimize noise that can be introduced. Because a digital signal is less susceptible to the effects of noise, the output line 64 between trigger circuit 60 and the refrigerator control can be made relatively long to carry the digital output signal to the refrigerator control.

By way of example, the following component values may be used for the circuit as shown in FIG. 3.

Thermistor—Keystone RL0504-8783-95-GX
Comparators CP1 and CP2—Type LM 2901
Positive Voltage Source $V+ = 8.5V$
Resistor $45 = 32K$
Potentiometer $44 = 15K$
$R1 = 10K$
$R2 = 10K$
$R3 = 5.6K$
$R4 = 3.3K$
$R5 = 68K$
$R6 = 10K$
$R7 = 10K$
$R8 = 470K$
$R9 = 3.3K$
$R10 = 1K$
$C1 = 0.047 \mu f$
$C2 = 4.7 \mu f$
$C3 = 0.047 \mu f$
$C4 = 0.047 \mu f$ Having described the invention, the embodiments of the invention in which an exclusive property or privilege is claimed are defined as follows:

1. In a refrigerator system having refrigeration apparatus for cooling a refrigerated compartment, a temperature sensing circuit with improved immunity to noise occurring in the refrigerator system, comprising:
   a circuit board for the temperature sensing circuit located within the refrigerated compartment;
   an analog temperature sensing device mounted in the refrigerated compartment and connected to the circuit board for coupling a low level analog sensing signal to the temperature sensing circuit; and
   a trigger circuit on the circuit board for generating a digital output as the temperature sensed by the analog device varies above or below a set point including an adjustable potentiometer mounted on the circuit board for manual adjustment of a set point, the potentiometer being connected in a voltage divider network with the analog temperature sensing device, and wherein the trigger circuit further includes a pair of cascaded comparator stages with the first stage coupled to the voltage divider network and having substantially no hysteresis in its response and the second comparision stage having substantial hysteresis in its response to produce the digital output.

2. The refrigerator system of claim 1 wherein the analog temperature sensing device is located in close proximity to the circuit board to minimize the lead length of the wire connecting the analog temperature sensing device to the circuit board.

3. In a refrigerator system having refrigeration apparatus for cooling a refrigerated compartment and a temperature responsive refrigerator control exterior of the refrigerated compartment, a temperature sensing circuit with improved immunity to noise occurring in the refrigerator system, comprising:

a circuit board for the temperature sensing circuit located within the refrigerated compartment;

an analog temperature sensing device mounted in the refrigerated compartment and connected to the circuit board for coupling a low level analog sensing signal to the temperature sensing circuit;

a trigger circuit on the circuit board for generating a digital output as the temperature sensed by the analog device varies above or below a set point including a pair of cascaded comparison stages with the first stage coupled to the analog temperature sensing device and having substantially no hysteresis in its response and the second comparison stage having substantial hysteresis in its response to produce the digital output; and a housing for the refrigerator control located external to the refrigerated compartment, and a wire connecting the circuit board to the external housing for coupling the digital output to the refirgerator control therein.

4. In a refrigerator system having refrigeration apparatus for cooling a refrigerated compartment, a temperature sensing circuit with improved immunity to noise occurring in the refrigerator system, comprising:

a circuit board for the temperature sensing circuit located within the refrigerated compartment;

an analog temperature sensing device mounted in the refrigerated compartment and connected to the circuit board for coupling a low level analog sensing signal to the temperature sensing circuit; and a trigger circuit on the circuit board for generating a digital output as the temperature sensed by the analog device varies above or below a set point, wherein the trigger circuit includes a pair of cascaded comparison stages with the first stage coupled to the analog temperature sensing device and having substantially no hysteresis in its response and the second comparison stage having substantial hysteresis in its response to produce the digital output.

5. The refrigerator system of claim 4, wherein the trigger circuit includes an integrator coupled between the cascaded comparison stages.

* * * * *